United States Patent
Brock et al.

(10) Patent No.: US 11,214,367 B2
(45) Date of Patent: Jan. 4, 2022

(54) SYSTEMS AND METHODS FOR SECURE TRANSPORTATION AND SAFE DEPLOYMENT OF UNMANNED AERIAL VEHICLES

(71) Applicant: Ford Global Technologies, LLC, Dearborn, MI (US)

(72) Inventors: Nelson Brock, Palo Alto, CA (US); James Carthew, Oakland, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 312 days.

(21) Appl. No.: 16/458,144

(22) Filed: Jun. 30, 2019

(65) Prior Publication Data

US 2020/0407057 A1 Dec. 31, 2020

(51) Int. Cl.
*B64C 39/02* (2006.01)
*B64D 45/00* (2006.01)
*G07C 5/08* (2006.01)
*G07C 5/00* (2006.01)

(52) U.S. Cl.
CPC ............ *B64C 39/024* (2013.01); *B64D 45/00* (2013.01); *G07C 5/008* (2013.01); *G07C 5/0816* (2013.01); *B64C 2201/08* (2013.01); *B64C 2201/208* (2013.01)

(58) Field of Classification Search
CPC ............ B64C 39/024; B64C 2201/208; B64C 2201/08; B64C 27/08; B64C 2201/024; B64C 39/02; B64D 45/00; G07C 5/008; G07C 5/0816; G07C 5/00; B60P 3/11; B60P 7/135; B64F 1/04
See application file for complete search history.

(56) References Cited

U.S. PATENT DOCUMENTS

| | | | |
|---|---|---|---|
| 4,969,396 A * | 11/1990 | Siebert | F42C 15/295 102/221 |
| 9,033,281 B1 * | 5/2015 | Adams | B64D 9/00 244/190 |
| 9,056,676 B1 | 6/2015 | Wang | |
| 9,527,596 B1 * | 12/2016 | Adams | B64C 39/024 |
| 9,545,852 B2 | 1/2017 | Streett | |
| 9,561,871 B2 | 2/2017 | Sugumaran | |
| 9,969,504 B1 * | 5/2018 | Davis | B64F 1/06 |
| 9,994,335 B1 * | 6/2018 | Been | B64F 1/06 |
| 11,040,782 B1 * | 6/2021 | Johnson | B64F 1/00 |

(Continued)

OTHER PUBLICATIONS

Mitka, N. (Mar. 7, 2017). Search & Rescue Land Rover Deploys Drone From Roof (7 pages). Retrieved from https://gearjunkie.com/land-rover-red-cross-search-and-rescue-drone-project-hero.

*Primary Examiner* — Yonel Beaulieu
(74) *Attorney, Agent, or Firm* — Brandon Hicks; Eversheds Sutherland (US) LLP

(57) ABSTRACT

Systems and methods for secure transportation and safe deployment of unmanned aerial vehicles are disclosed herein. An example method includes performing a UAV preflight procedure that includes determining UAV startup sounds from sound signals received from a microphone positioned within a housing that houses the UAV, determining synchronized rotation of propellers of the UAV, determining that no obstructions are present above the housing based on range finder signals; and releasing the UAV after completion of the UAV preflight procedure.

20 Claims, 5 Drawing Sheets

(56) References Cited

U.S. PATENT DOCUMENTS

| | | | |
|---|---|---|---|
| 2005/0017129 A1* | 1/2005 | McDonnell | B64C 25/68 244/110 G |
| 2015/0321758 A1 | 11/2015 | Sama, II | |
| 2016/0207637 A1* | 7/2016 | Campillo | B64C 39/024 |
| 2016/0347477 A1* | 12/2016 | Tully | B64F 1/08 |
| 2017/0115667 A1* | 4/2017 | Marr | G08G 5/0034 |
| 2017/0158353 A1* | 6/2017 | Schmick | B60L 53/12 |
| 2017/0190423 A1 | 7/2017 | Salgueiro et al. | |
| 2018/0009549 A1* | 1/2018 | Sullivan | B64C 39/024 |
| 2018/0170414 A1* | 6/2018 | Arndt | B61L 27/0094 |
| 2018/0190042 A1* | 7/2018 | Gordon | G07C 5/0808 |
| 2018/0321676 A1* | 11/2018 | Matuszeski | G05D 1/0016 |
| 2019/0077519 A1* | 3/2019 | Husain | B60L 53/30 |
| 2020/0033854 A1* | 1/2020 | Jeong | B64D 27/24 |
| 2020/0180754 A1* | 6/2020 | Schonfelder | G01G 19/08 |
| 2020/0241575 A1* | 7/2020 | Meisenholder | G05D 1/12 |
| 2020/0358185 A1* | 11/2020 | Tran | H01Q 3/20 |
| 2020/0407057 A1* | 12/2020 | Brock | G07C 5/0816 |
| 2021/0129982 A1* | 5/2021 | Collins | B64C 39/024 |

\* cited by examiner

SYSTEMS AND METHODS FOR SECURE TRANSPORTATION AND SAFE DEPLOYMENT OF UNMANNED AERIAL VEHICLES

FIELD OF THE DISCLOSURE

The disclosure generally relates to unmanned aerial vehicles (UAVs) and to apparatuses and methods for secure transportation thereof, as well as efficient and safe deployment of UAVs.

BACKGROUND

UAVs can be transported and launched from mobile environments such as vehicles. Preflight checks are utilized to determine UAV suitability prior to UAV launch. These methods are time consuming and often require the participation of a UAV operator. Some preflight checks can take five to ten minutes to complete, and may be tactically disadvantageous when immediate UAV use is needed. Typically, a UAV pilot and navigator may be required to retrieve the UAV equipment from a transport vehicle, unpack, perform preflight checks prior to launching the UAV.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In general, the present disclosure is directed to systems and methods for secure transportation and safe deployment of unmanned aerial vehicles. In some embodiments, the systems and methods may determine a safe operating condition of the UAV through error checking. If a safe operating condition is determined, the UAV can be launched through an automated deployment. In general, the UAV can be launched without any direct software communication between the UAV and a transport vehicle, allowing a UAV pilot to use their preferred brand UAV while gaining the benefits of UAV-vehicle integration. In general, the systems and methods can be configured to observe a state of the UAV without direct software communication. The systems and methods can be configured to secure the UAV while being agnostic to a form factor of the UAV. The systems and methods can also determine an observed state of the UAV, in addition to a communicated state of the transport vehicle, to determine if the UAV should be launched. For example, the UAV may not be released if a velocity of the transport vehicle is above a velocity threshold.

According to some embodiments, the systems and methods of the present disclosure are configured to secure, transport, and automatically deploy a UAV in such a way that allows the UAV pilot to operate the UAV without requiring the UAV operator to perform any setup beyond activating the UAV using an existing radio controller. In some embodiments, the systems and methods may allow the UAV to launch when it is determined to be operating correctly and the launch environment is determined to be safe for launch. Some embodiments include a vehicle top transport container (e.g., apparatus/housing); other mounting options can also be utilized.

Illustrative Embodiments

Figure 1:
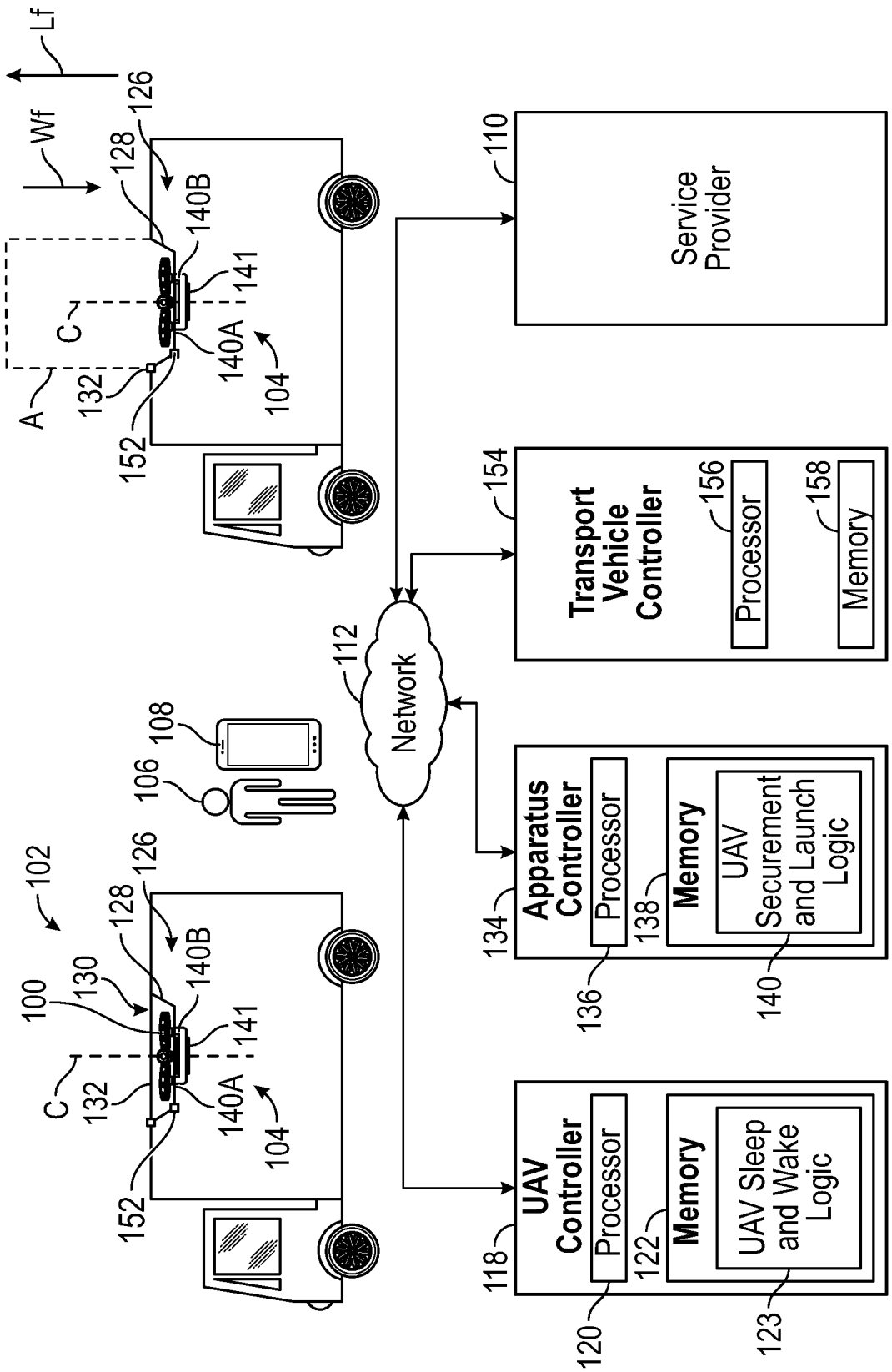
FIG. 1 is a perspective view that depicts an example operating environment for practicing aspects of the present disclosure.

Turning now to the drawings, FIG. 1 depicts an illustrative environment in which techniques and structures for providing the systems and methods disclosed herein may be implemented. The illustrative environment may include a UAV 100, a transport vehicle 102, a UAV storage and launching apparatus (hereinafter apparatus 104), an operator 106, a remote UAV control device 108 (also referred to as an operator device), a service provider 110, and a network 112.

The UAV 100 can be transported in the apparatus 104 that is integrated into the transport vehicle 102. In some embodiments, UAV preflight analyses can be performed through the apparatus 104. In one example embodiment, the operator 106 can initiate a UAV wakeup procedure using the remote UAV control device 108. When the UAV 100 is awake, the apparatus 104 can perform or execute a preflight procedure. If the preflight procedure is successful, the UAV 100 can be launched. Conversely, if the preflight procedure is unsuccessful, the UAV 100 is not launched.

Figure 2:
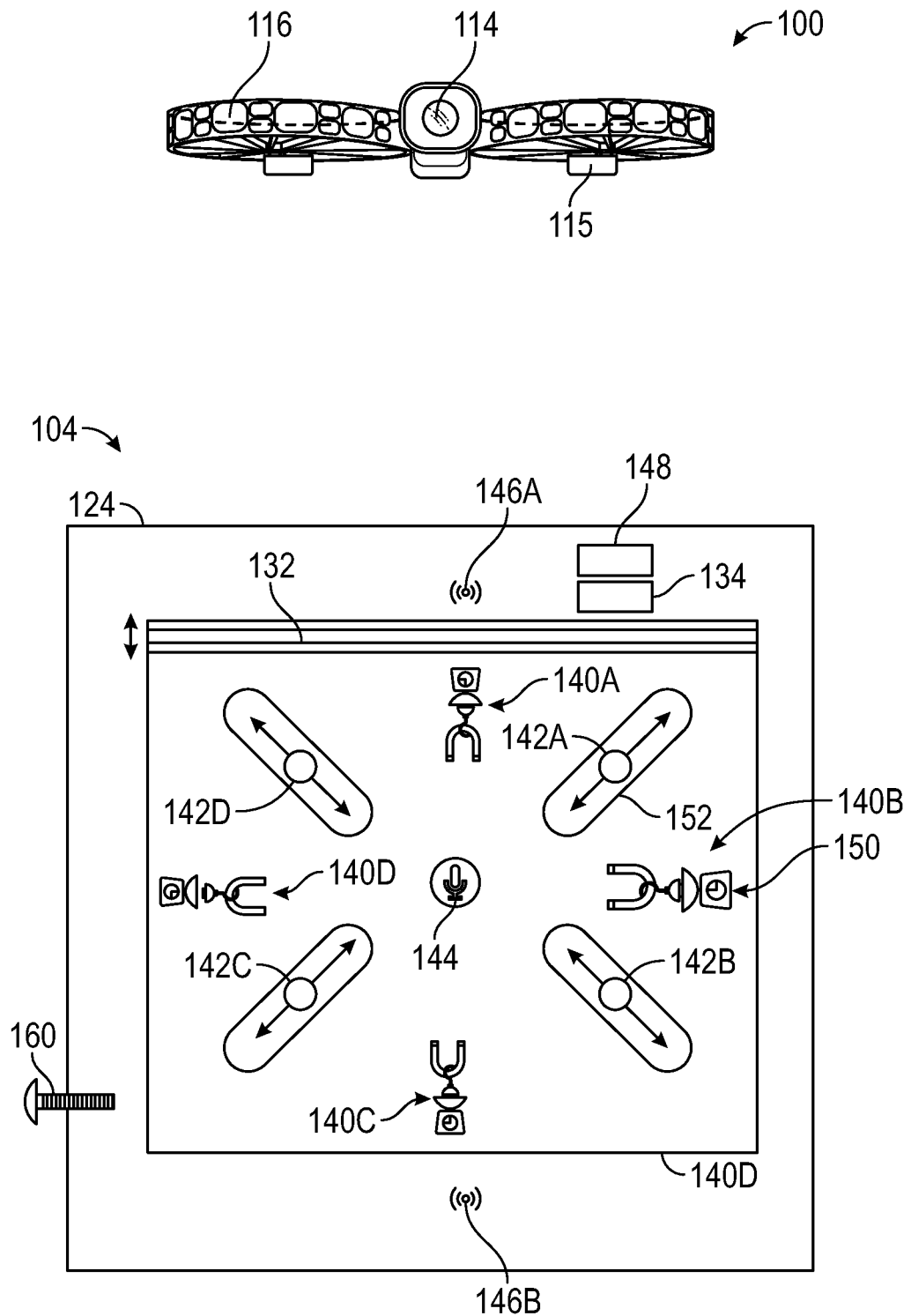
FIG. 2 illustrates a perspective view of an example UAV and a schematic diagram of an example UAV storage and launching apparatus of the present disclosure.

Referring collectively to FIGS. 1 and 2, the UAV 100 can include any suitable unmanned aerial vehicle such as a quadcopter or the like. The UAV 100 generally comprises a body 114, a plurality of propellers 116 (in this example four propellers), and a UAV controller 118. In various embodiments, the body 114 of the UAV 100 is provided with a securement mechanism 115 for releasably securing the UAV 100 within the apparatus 104. In one embodiment, the securement mechanism 115 is a magnet. In another embodiment, the securement mechanism 115 is a ring or other protrusion or portion of the body 114 of the UAV 100.

The UAV controller 118 can comprise a processor 120 and memory 122 for storing executable instructions. For example, the executable instructions could include logic that allows the UAV 100 to enter various modes of operation such as sleep mode and wake mode. Thus, the memory 122 can store UAV sleep and wake logic 123. In general, when the UAV 100 is secured in the apparatus 104, the UAV 100 can be in sleep mode. When a wake signal is received from the remote UAV control device 108, the UAV 100 enters the wake mode. Preflight and flight modes can occur during the wake mode of UAV operation. In various instances, the remote UAV control device 108 could include a standard or native UAV control device (e.g., OEM controller), a mobile device/application, or a controller of the transport vehicle 102 (e.g., SYNC™)—just to name a few.

As noted above, the systems and methods herein reduce the amount of setup required to be performed by the operator 106 prior to flight. It will be understood that the UAV 100 is configured with a sleep mode and may wake upon connection with the network 112 or based on a signal received directly from the remote UAV control device 108. The network 112 can include any one or a combination of multiple different types of networks, such as cable networks, the Internet, wireless networks, and other private and/or public networks. In some instances, the network 112 may include cellular, Wi-Fi, or Wi-Fi direct. In some embodiments, the UAV 100 can communicate using device-to-device communication over a short range wireless connection such as Bluetooth or near-field communication (NFC).

The apparatus 104 includes a housing 124 that can be integrated into a frame of the transport vehicle 102. For example, the housing can be integrated into a roof of the transport vehicle 102. In some embodiments, the housing 124 includes a lower portion 126 having sloped sidewalls 128. The UAV 100 can be positioned towards a center C of a cavity 130 of the housing 124. In various embodiments, the housing 124 comprises an actuated roof 132 that can be retracted to expose the UAV 100 or extended to enclose the UAV 100. The actuated roof 132 is illustrated in both open (leftmost view) and closed (rightmost view) configurations in FIG. 1.

The apparatus 104 further comprises an apparatus controller 134 that includes a processor 136 and memory 138. The memory 138 stores logic, such as a securement and launching logic 140. The securement and launching logic 140 can be used to control operation of apparatus components as discussed in greater detail herein with reference to launching of the UAV 100.

In various embodiments, the apparatus 104 includes additional components such as one or more securing elements, such as securing elements 140A-140D, propeller sensor elements 142A-142D, a microphone 144, and one or more range finders, such as range finders 146A and 146B. In general, the apparatus controller 134 can be configured to determine a safe operating condition of the UAV 100 and allow the UAV to launch when the safe operating condition is determined. Methods for determining UAV safe operating conditions and launching of the UAV 100 are disclosed in greater detail infra. In one or more embodiments, the apparatus 104 comprises a communications interface 148 that allows the apparatus controller 134 to communicate with the UAV 100 and/or a controller of the transport vehicle 102.

In general, the securing elements 140A-140D can be utilized to secure the UAV 100 within the housing 124 during transport or other instances when the UAV 100 is not in use. The securing elements 140A-140D can include electromagnets or mechanical grasping elements. In one embodiment, in FIG. 1, the two of the securing elements 140A and 140B are associated with an electromagnet coil 141. Securing elements 140C and 140D can also be associated with the electromagnet coil 141, but are not illustrated in this view.

In embodiments where the securing elements 140A-140D are electromagnets, the securing elements 140A-140D can attract the securement elements 115 (e.g., magnets) disposed on the body 114 of the UAV 100. In embodiments where the securing elements 140A-140D are mechanical grasping elements, the mechanical grasping elements can hook or grab the body 114 of the UAV 100. It will be understood that the securing elements 140A-140D can be fewer or greater in number than those illustrated and described herein. In various embodiments, the securing elements 140A-140D are oriented within the housing in such a way that they do not interfere with movement of the propellers 116 of the UAV 100. Thus, in a secured position, the UAV 100 is positioned such that the securing elements 140A-140D are positioned between the propellers 116.

In various embodiments, one or more of the securing elements 140A-140D can be associated with a force sensor 150. In one embodiment, the force sensor 150 can be configured to sense UAV forces such as a weight force $W_f$ and a lift force $L_f$ (see FIG. 1 with forces illustrated as arrows). The weight force $W_f$ is created by a weight of the UAV 100 that is exerted when the UAV 100 is landed and secured in the housing 124. The weight force is distributed across each of the force sensors associated with the securing elements 140A-140D. The lift force $L_f$ can be measured by the force sensor 150 when the UAV 100 begins to fly and create lift forces against the securing elements 140A-140D. In one embodiment, the lift force $L_f$ can be measured by a magnitude of the electric force used by the securing elements 140A-140D to maintain the UAV 100 in a secured configuration.

The propeller sensor elements 142A-142D each generates propeller rotation signals that are indicative of rotation of the propellers of the UAV. In some embodiment the number of the propeller sensor elements of the apparatus 104 corresponds to the number of propellers of the UAV 100. Examples of propeller sensor elements include, but are not limited to, infrared or LIDAR (light detection and ranging) sensors that detect spinning of the propellers as fluctuations in proximity data. For example, proximity data can include data that represents a distance value between a sensor and the nearest object. Generally, the output of sensors can be calibrated as the sensors may output a number within a range of approximately between 0 and a maximum value allowed by the bit resolution of the sensor. For example, an eight bit sensor may produce a value between 0-255, using 16 bit increases that resolution to 0-65536. A scaling factor is used to relate this raw measurement to a useful number (like distance in mm or temperature in K, and so forth). In accordance with the present disclosure, sensors as utilized herein may be configured to measure a rate of change in these raw sensor values, which are indicative of proximity data. That is, the data are indicative of a distance measurement of how close a propeller is to a sensor. In one example use case when a sensor generates its proximity data with a pattern that alternates between high, low, high, low . . . at a certain frequency, the apparatus controller 134 may determine that this pattern is indicative of a propeller spinning. This pattern can be determined by the apparatus controller 134 using a time/frequency transform algorithm such as Fast Fourier Transform.

In another embodiment, the propeller sensor elements include EMF (electromotive force) sensors that detect a magnetic field of a rotating motor of a propeller.

The microphone 144 can be utilized to detect UAV sounds such as propeller rotation or beeping. For example, when the UAV 100 is initialized, beeping sounds may be produced by the UAV 100. The apparatus controller 134 can be configured to identify UAV start up sounds using signals generated by the microphone 144.

In various embodiments, the propeller sensor elements, such as propeller sensor element 142A, are each mounted on a sensor element track, such as sensor element track 152. The sensor element track 152 can include a moveable platform that is driven by a motor (not shown). Actuation of the motor can be controlled using the apparatus controller 134.

In other embodiments, the propeller sensor element 142A can be translated manually along the sensor element track 152. Generally, the placement of the propeller sensor elements on the sensor element tracks allows for selective radial positioning of the propeller sensor elements at various distances away from the center C of the housing 124. In some embodiments, a propeller sensor element is moved so that it can be positioned beneath or proximate a swept area of a propeller. In some embodiments, this includes moving the propeller sensor element near a motor of the propeller, but not in an obscured position (e.g., being obscured by a portion of the body 114 of the UAV 100 for example). In various embodiments, each (or a portion) of the securing elements 140A-140D can also be disposed on a track, which allows the securing elements 140A-140D to translate towards or away from the center C of the housing 124. The translatability of the sensor elements and securing elements allows for adaptation to UAVs having varying form factors.

Standard or average UAV size and geometry can be utilized to initially place the propeller sensor elements on tracks such that the end user can set the exact position of the sensor. In some embodiments, the position of a propeller sensor element can be maintained using a fastener like a screw or pull-spring element that allows the user to secure the propeller sensor element in its position on the sensor element track 152.

The range finders 146A and 146B can be utilized to sense objects or obstructions in airspace A above the transport vehicle 102. In some embodiments, this includes the airspace A directly above the housing 124. Range finder signals can be used to prevent UAV launch when obstructions are present such as trees, electrical wires, bridges, and other similar objects. The dimensions of the airspace A examined can vary according to design or operational requirements. For example, a height of the airspace that is examined can be dictated by the capabilities of the range finders 146A and 146B.

In various embodiments, the apparatus 104 can comprise one or more dampers 152 that provides a damping effect to reduce vibratory effects cause, for example, by movement of the transport vehicle 102. That is, the one or more dampers 152 reduce the impact of vehicle dynamics when the securing of the UAV 100 within the apparatus 104. The dampers could include shock absorbers, resilient washers or spacers, or other suitable damper elements.

Generally, the transport vehicle 102 can comprise a vehicle controller 154 that can be used to initiate the UAV preflight procedures disclosed herein. The vehicle controller 154 comprises a processor 156 and memory 158. In addition to providing various vehicle related operations, the vehicle controller 154 can provide the apparatus 104 with vehicle-specific information such as transport vehicle velocity, as will be discussed in greater detail herein.

Figure 3:
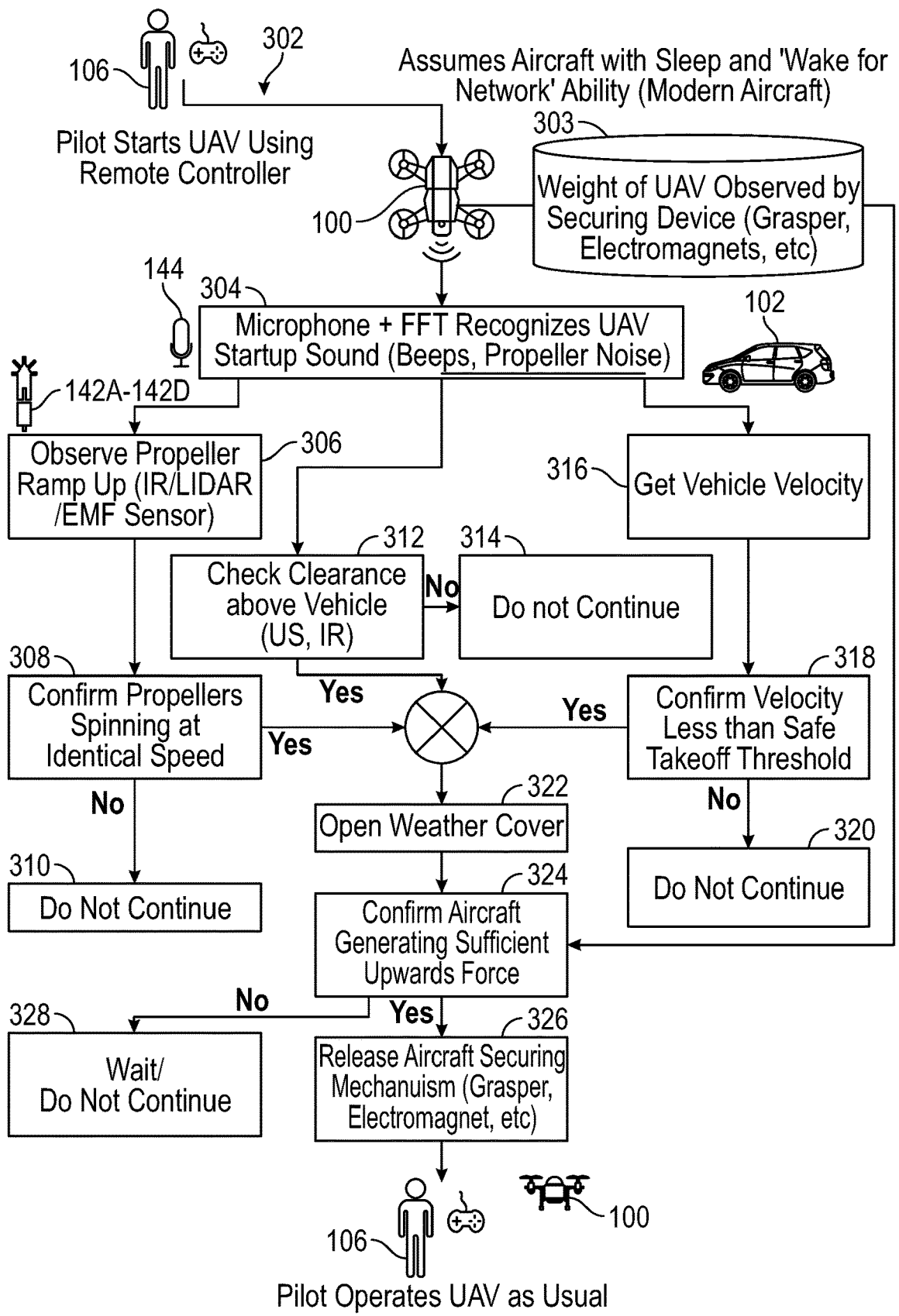
FIG. 3 is a flow diagram of example methods of the present disclosure.

FIG. 3 is a flowchart of an example method that can be performed by a controller of the present disclosure. The method relates to a preflight and launch procedure for the UAV 100. In various embodiments, an example preflight and launch process can be performed by any of the UAV controller 118, the apparatus controller 134, the vehicle controller 154, or in some embodiments the service provider 110 (see FIG. 1). In various embodiments, the service provider 110 includes a server or cloud-computing resource that is configured with UAV securement and launching, such as securement and launching logic 140 (also see FIG. 1). The service provider 110 acts as a distributed computing resource for off device processing.

Generally, it will be understood that the UAV 100 is secured within the apparatus 104. That is, the securing elements 140A-140D have been used to lock the UAV 100 into a secure configuration within the housing 124. The actuated roof 132 of the apparatus 104 is in a closed configuration.

For purposes of clarity, the following description will reference the apparatus controller 134 as the selected controller. In various embodiments, as depicted in FIG. 3, the method begins at 302 when an operator 106 initiates the UAV 100 with the remote UAV control device 108. The UAV 100 is in sleep mode until a wakeup signal is received from the remote UAV control device 108. At 303, the apparatus controller 134 can obtain force data from the force sensor 150 that includes the weight force of the UAV 100. Next, at 304, when the UAV 100 is awake, sound signals obtained by the microphone 144 are obtained by the apparatus controller 134 and evaluated to identify start up sounds of the UAV 100 such as beeps or propeller sounds. In some embodiments, the apparatus controller 134 processes the microphone signals using Fast Fourier Transform. Generally, UAVs typically emit high-pitch sounds (approximately 3 kHz to 8 kHz, inclusive) during startup. These same high pitch sounds do not travel well through housing material when compared with low pitch sounds. The enclosed nature of the apparatus 104 reduces the likelihood of false positive startup sound detection. In another embodiment, at 306, the apparatus controller 134 can determine an increase in propeller speed as being indicative of a startup process.

If the UAV is in an awakened state, the apparatus controller 134 can then assess various safety conditions related to both UAV operational parameters and local environment parameters. At 308, an example UAV operational parameter includes the apparatus controller 134 determining if the propellers 116 are rotating in synchronization (e.g., same speed). To be sure, when each of the propellers 116 is not rotating at the same speed, this may indicate an aberrant behavior such as a damaged propeller or motor. At 310, if the propellers 116 are not rotating at the same speed, a no-fly-condition is determined by the apparatus controller 134 and a launch of the UAV 100 may not occur.

According to some embodiments, at 312, the apparatus controller 134 can assess local environment parameters related to airspace clearance. For example, the apparatus controller 134 can receive range finder signals generated by the range finders 146A and 146B to determine if/when obstructions or objects are present in the airspace above the apparatus 104 (e.g., generally above a directly upward flight path of the UAV 100 as it exits the apparatus 104). Stated otherwise, the area above the apparatus 104 is inspected for obstructions such as trees, power lines, bridges, and the like. If an obstruction is detected, at 314, a no-fly-condition is determined by the apparatus controller 134 and a launch of the UAV 100 may not occur.

In another example embodiment, at 316 and 318, a velocity of the transport vehicle 102 can be considered as a safety condition. At 320, if the transport vehicle 102 is traveling at a velocity that is sufficiently high, it may create deleterious launch conditions for the UAV 100. In one example, if the transport vehicle 102 is traveling at a velocity that is in excess of 25 miles per hour, it may be unsafe to launch the UAV 100. Generally, the apparatus controller 134 can receive transport vehicle velocity data from the vehicle controller 154. The apparatus controller 134 can compare the velocity of the transport vehicle 102 to a velocity threshold. When the velocity of the transport vehicle 102 is at or below the velocity threshold, the UAV 100 can be launched. Conversely, when the velocity of the transport vehicle 102 is above the velocity threshold, the UAV 100 may not be launched. It will be understood that the velocity threshold can be set according to design specifications (which could include UAV thrust or maneuvering capabilities) or user preferences.

The preflight check parameters discussed above can include any combination of propeller synchronization, airspace clearance checking, and/or transport vehicle velocity determination. If the preflight check is passed, a launching sequence can be initiated or executed by the apparatus controller 134. In some embodiments, at 322, the launching sequence includes the apparatus controller 134 opening the actuated roof 132. Next, at 324, the apparatus controller 134 determines if the UAV 100 is producing sufficient thrust for takeoff. In some embodiments, the apparatus controller 134 can determine lift forces from output provided by the force sensor 150. It will be understood that the output measured by the apparatus controller 134 includes a pulling force exerted by the UAV 100 against the securing members 140A-140D. That is, when the propellers 116 of the UAV 100 generate thrust that produces a lift force that exceeds a weight force of the UAV 100, the UAV 100 is ready for flight. Once the lift force is sufficient, at 326, the controller 134 causes the securing members 140A-140D to disengage from the UAV 100, which allows the UAV 100 to exit the apparatus 104. As with other parameters, the lift force can be measured relative to a threshold. For example, the lift force is sufficient for launch when the lift force is three times the weight force of the UAV 100. To be sure, other measurements for determining the sufficiency of the lift force can be utilized. At 328, in instances where the lift force is not sufficient, a no-fly-condition is determined by the apparatus controller 134 and a launch of the UAV 100 may not occur. If a launch occurs, the operator 106 can control the UAV 100 using the remote UAV control device 108.

According to some embodiments, when the operator 106 is finished using the UAV 100, the UAV 100 can be placed back into the housing 124 of the apparatus 104. An actuator 160, such as a button or toggle, can be disposed on the housing 124. The actuator 160 can be utilized by the operator 106 to engage the securing members 140A-140D and secure the UAV 100.

Figure 4:
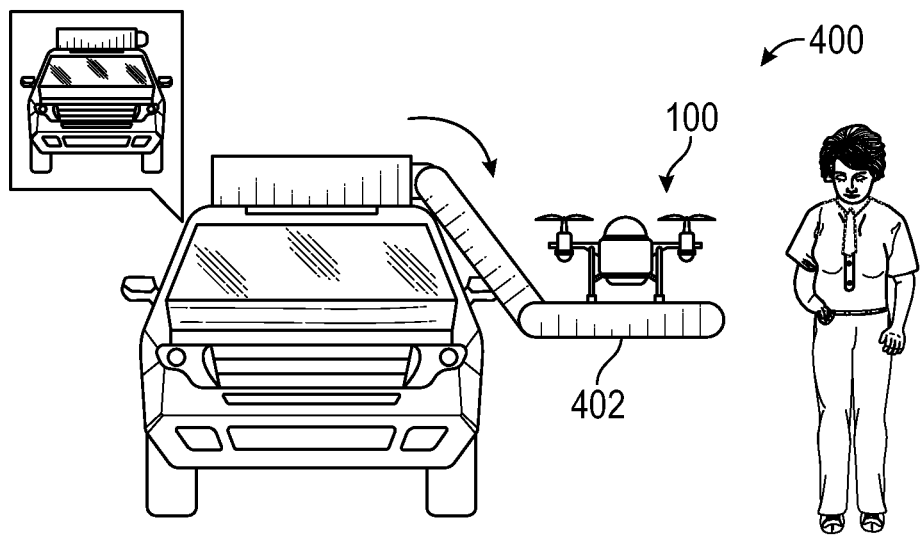
FIG. 4 is a perspective view that depicts another example operating environment for practicing aspects of the present disclosure.
Figure 5:
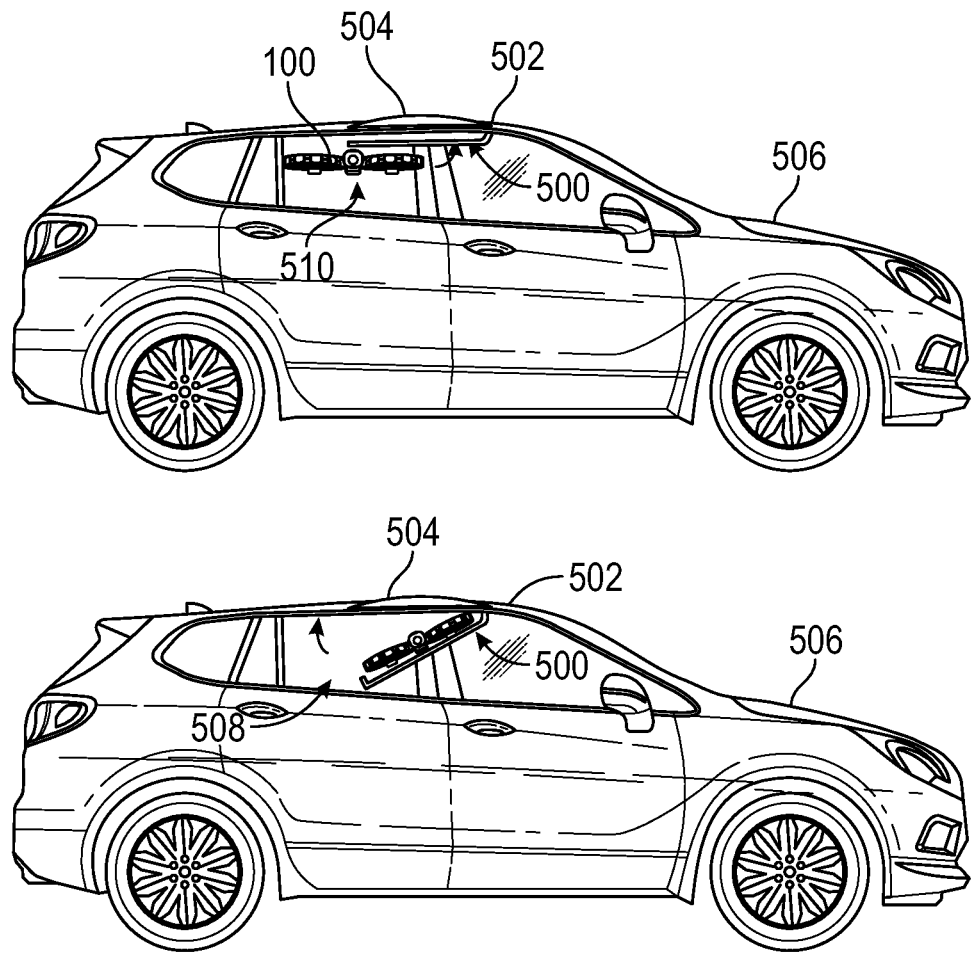
FIG. 5 UAV storage and launching apparatus is a perspective view that depicts yet another example operating environment for practicing aspects of the present disclosure.

FIG. 4 illustrates an embodiment of another example housing 400. The housing 400 can include a sliding or articulating drawer mechanism 402 that extends to receive and launch the UAV 100. FIG. 5 illustrates an embodiment of another example housing 500 that includes a pivoting mechanism 502 that cooperates with a sunroof 504 of a vehicle 506. The housing 500 can be moved to an open position 508 to receive the UAV 100 and moved into a closed position 510 for storage or launching of the UAV 100.

The systems or apparatuses described herein can be implemented with automated battery charging however, for human controlled flight, hand swapping of the battery can also be utilized. A battery can be used to power the UAV and/or the apparatus. The transport vehicle can comprise an in-vehicle battery charger allowing the operator to maintain a store of charged batteries. In other embodiments, integrating a battery charging system into the apparatus allows for the UAV to stay in sleep and wake for network mode for longer periods of time without significantly impacting battery life.

Figure 6:
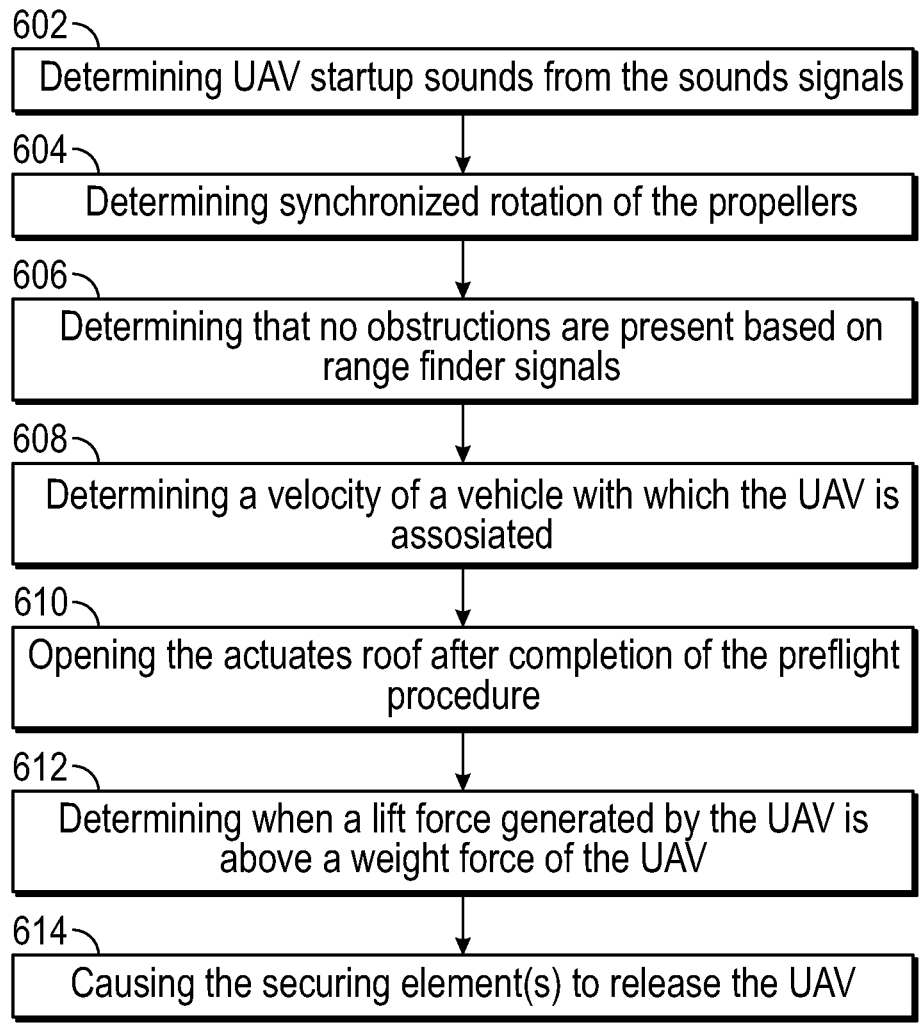
FIG. 6 is a flowchart of an example method of the present disclosure.

FIG. 6 is a flowchart of an example method of the present disclosure. The method generally includes a step 602 of determining UAV startup sounds from the sound signals. To be sure, the UAV can be transitioned from a sleep to wakened state by an operator using an operator device, such as a remote control. As noted above, the startup sounds include any sounds that are indicative of the UAV such as beeping or propeller rotation. Some embodiments can utilize fast Fourier transform analysis of microphone signals obtained from an enclosure that houses the UAV.

Next, the method includes a step 604 of determining synchronized rotation of the propellers. This determination can be made based on the output of propeller sensor elements. If the propellers are spinning in synchronization (e.g., the same speed) as one another, the method can include a step 606 of determining that no obstructions are present based on range finder signals. In sum, this step ensures that clear airspace exists above the UAV and its enclosure. Steps 602-606 are collectively referred to as a preflight procedure. Collectively, these data are used to determine a safe operating condition of the UAV based on any combination of sound signals received from the microphone, the propeller rotation signals, and range finder signals.

In addition to these steps, in some embodiments, the method can include an optional step 608 of determining a velocity of a vehicle with which the UAV is associated. It will be understood that the UAV may be allowed to launch when the velocity is at or below a vehicle velocity threshold. Thus, the preflight procedure can include the optional step 608.

In one or more embodiments, when the preflight procedure is complete, the method can transition to a launching procedure. In some embodiments, the method can include a step 610 of opening the actuated roof after completion of the preflight procedure. Once the actuated roof is open, the method can include a step 612 of determining when a lift force generated by the UAV is above a weight force of the UAV. If the lift force is sufficient, the method can include a step 614 of causing the securing element(s) to release the UAV. As noted above, the sufficiency of the lift force can vary according to UAV design or operational parameters.

Example Embodiments

Example 1 may include a system, comprising: a housing configured to receive and retain an unmanned aerial vehicle (UAV); a securing element configured to releasably secure the UAV within the housing; at least one propeller sensor element configured to obtain propeller rotation signals of at least one propeller of the UAV; and a controller comprising a processor and memory for storing instructions, the processor executing the instructions to: determine a safe operating condition of the UAV based on at least the propeller rotation signals; and allow the UAV to launch when the safe operating condition is determined.

Example 2 may include the system according to example 1 and/or some other example herein, wherein the propeller sensor elements are each mounted on a sensor element track, the propeller sensor elements being configured to translate along the sensor element tracks allowing the propeller sensor elements to be positioned at a radial distance from a center of the housing.

Example 3 may include the system according to example 1 and/or some other example herein, further comprising a force sensor associated with the securing element.

Example 4 may include the system according to example 3 and/or some other example herein, wherein the controller is further configured to: determine a weight force and a lift force exerted by the UAV on the securing element based on force signals received from the securing element; and control the securing element in response to the weight force and the lift force to secure the UAV.

Example 5 may include the system according to example 4 and/or some other example herein, further comprising an actuated roof that covers an opening of the housing.

Example 6 may include the system according to example 5 and/or some other example herein, wherein the controller is further configured to: receive a wakeup signal from an operator device; and execute a preflight procedure that comprises: determining UAV startup sounds from the sound signals; determining synchronized rotation of the propellers; and determining that no obstructions are present.

Example 7 may include the system according to example 6 and/or some other example herein, wherein the controller is further configured to: open the actuated roof after completion of the preflight procedure; and cause the securing element to release the UAV when the lift force of the UAV is approximately equivalent to the weight force of the UAV.

Example 8 may include the system according to example 1 and/or some other example herein, wherein the housing is associated with a vehicle, the housing being mounted to the vehicle using motion dampers.

Example 9 may include the system according to example 1 and/or some other example herein, wherein the securing element comprises any of an electromagnet or a grasping mechanism.

Example 10 may include the system according to example 1 and/or some other example herein, wherein the controller is further configured to selectively reposition one or more of the propellers based on a location of the propellers when the UAV is secured to the securing element within the housing.

Example 11 may include the system according to example 1 and/or some other example herein, wherein the securing element is configured to translate along a securing element track so as to be selectively positioned at a radial distance from a center of the housing.

Example 12 may include the system according to example 1 and/or some other example herein, wherein the controller is further configured to determine a velocity of a vehicle with which the housing is associated, wherein the UAV is allowed to launch when the velocity is at or below a vehicle velocity threshold.

Example 13 may include a method for rapid unmanned aerial vehicle (UAV) deployment, the method comprising: performing a UAV preflight procedure, comprising: determining UAV startup sounds from sound signals received from a microphone positioned within a housing that houses the UAV; determining synchronized rotation of propellers of the UAV; and determining that no obstructions are present above the housing based on range finder signals; and releasing the UAV after completion of the UAV preflight procedure.

Example 14 may include the method according to example 13 and/or some other example herein, wherein releasing further comprises opening an actuated roof after completion of the UAV preflight procedure.

Example 15 may include the method according to example 13 and/or some other example herein, further comprising determining a weight force and a lift force exerted by the UAV on a securing element based on force signals received from the securing element, the securing element releasably securing the UAV within the housing.

Example 16 may include the method according to example 15 and/or some other example herein, wherein releasing the UAV further comprises causing a securing element to release the UAV when the lift force of the UAV is approximately equivalent to the weight force of the UAV.

Example 17 may include the method according to example 13 and/or some other example herein, further comprising: obtaining a vehicle velocity from a vehicle controller of a vehicle; and wherein the UAV is not released when the vehicle velocity is at or above a velocity threshold.

Example 18 may include a method, comprising: identifying startup sounds for an unmanned aerial vehicle (UAV) within a housing in which the UAV is secured; confirming that propellers of the UAV are synchronized; determining that no obstructions are present in airspace above the UAV; confirming that the UAV is generating a lift force that is sufficient for takeoff; and releasing the UAV.

Example 19 may include the method according to example 18 and/or some other example herein, further comprising: obtaining a vehicle velocity from a vehicle controller of a vehicle; and wherein the UAV is not released when the vehicle velocity is at or above a velocity threshold.

Example 20 may include the method according to example 18 and/or some other example herein, further comprising opening an actuated roof of the housing before releasing the UAV.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system, comprising:
   a housing configured to receive and retain an unmanned aerial vehicle (UAV);
   a securing element configured to releasably secure the UAV within the housing;
   at least one propeller sensor element configured to obtain propeller rotation signals of at least one propeller of the UAV; and
   a controller comprising a processor and memory for storing instructions, the processor executing the instructions to:
      determine a safe operating condition of the UAV based on at least the propeller rotation signals; and
      allow the UAV to launch when the safe operating condition is determined.

2. The system according to claim 1, wherein the propeller sensor elements are each mounted on a sensor element track, the propeller sensor elements being configured to translate along the sensor element tracks allowing the propeller sensor elements to be positioned at a radial distance from a center of the housing.

3. The system according to claim 1, further comprising a force sensor associated with the securing element.

4. The system according to claim 3, wherein the controller is further configured to:
   determine a weight force and a lift force exerted by the UAV on the securing element based on force signals received from the securing element; and
   control the securing element in response to the weight force and the lift force to secure the UAV.

5. The system according to claim 4, further comprising an actuated roof that covers an opening of the housing.

6. The system according to claim 5, wherein the controller is further configured to:
   receive a wakeup signal from an operator device; and
   execute a preflight procedure that comprises:
      determining UAV startup sounds from the sound signals;
      determining synchronized rotation of the propellers; and
      determining that no obstructions are present.

7. The system according to claim 6, wherein the controller is further configured to:
   open the actuated roof after completion of the preflight procedure; and
   cause the securing element to release the UAV when the lift force of the UAV is approximately equivalent to the weight force of the UAV.

8. The system according to claim 1, wherein the housing is associated with a vehicle, the housing being mounted to the vehicle using motion dampers.

9. The system according to claim 1, wherein the securing element comprises any of an electromagnet or a grasping mechanism.

10. The system according to claim 1, wherein the controller is further configured to selectively reposition one or more of the propellers based on a location of the propellers when the UAV is secured to the securing element within the housing.

11. The system according to claim 1, wherein the securing element is configured to translate along a securing element track so as to be selectively positioned at a radial distance from a center of the housing.

12. The system according to claim 1, wherein the controller is further configured to determine a velocity of a vehicle with which the housing is associated, wherein the UAV is allowed to launch when the velocity is at or below a vehicle velocity threshold.

13. A method for rapid unmanned aerial vehicle (UAV) deployment, the method comprising:
   performing a UAV preflight procedure, comprising:
      determining UAV startup sounds from sound signals received from a microphone positioned within a housing that houses the UAV, wherein the UAV is configured to be releasably secured to a securing element of a housing;
      determining synchronized rotation of propellers of the UAV using propeller rotation signals captured by a propeller sensor; and
      determining that no obstructions are present above the housing based on range finder signals; and
   releasing the UAV after completion of the UAV preflight procedure.

14. The method according to claim 13, wherein releasing further comprises opening an actuated roof after completion of the UAV preflight procedure.

15. The method according to claim 13, further comprising determining a weight force and a lift force exerted by the UAV on a securing element based on force signals received from the securing element, the securing element releasably securing the UAV within the housing.

16. The method according to claim 15, wherein releasing the UAV further comprises causing a securing element to release the UAV when the lift force of the UAV is approximately equivalent to the weight force of the UAV.

17. The method according to claim 13, further comprising:
obtaining a vehicle velocity from a vehicle controller of a vehicle; and
wherein the UAV is not released when the vehicle velocity is at or above a velocity threshold.

18. A method, comprising:
identifying startup sounds for an unmanned aerial vehicle (UAV) within a housing in which the UAV is secured, wherein the UAV is releasably secured within the housing using a securing element, wherein a force sensor is associated with the securing element;
determining that no obstructions are present in airspace above the UAV;
determining a weight force and a lift force exerted by the UAV on the securing element based on force signals received from the securing element; and
controlling the securing element in response to the weight force and the lift force to secure the UAV.

19. The method according to claim 18, further comprising:
obtaining a vehicle velocity from a vehicle controller of a vehicle; and
wherein the UAV is not released when the vehicle velocity is at or above a velocity threshold.

20. The method according to claim 18, further comprising opening an actuated roof of the housing before releasing the UAV.

* * * * *